UNITED STATES PATENT OFFICE.

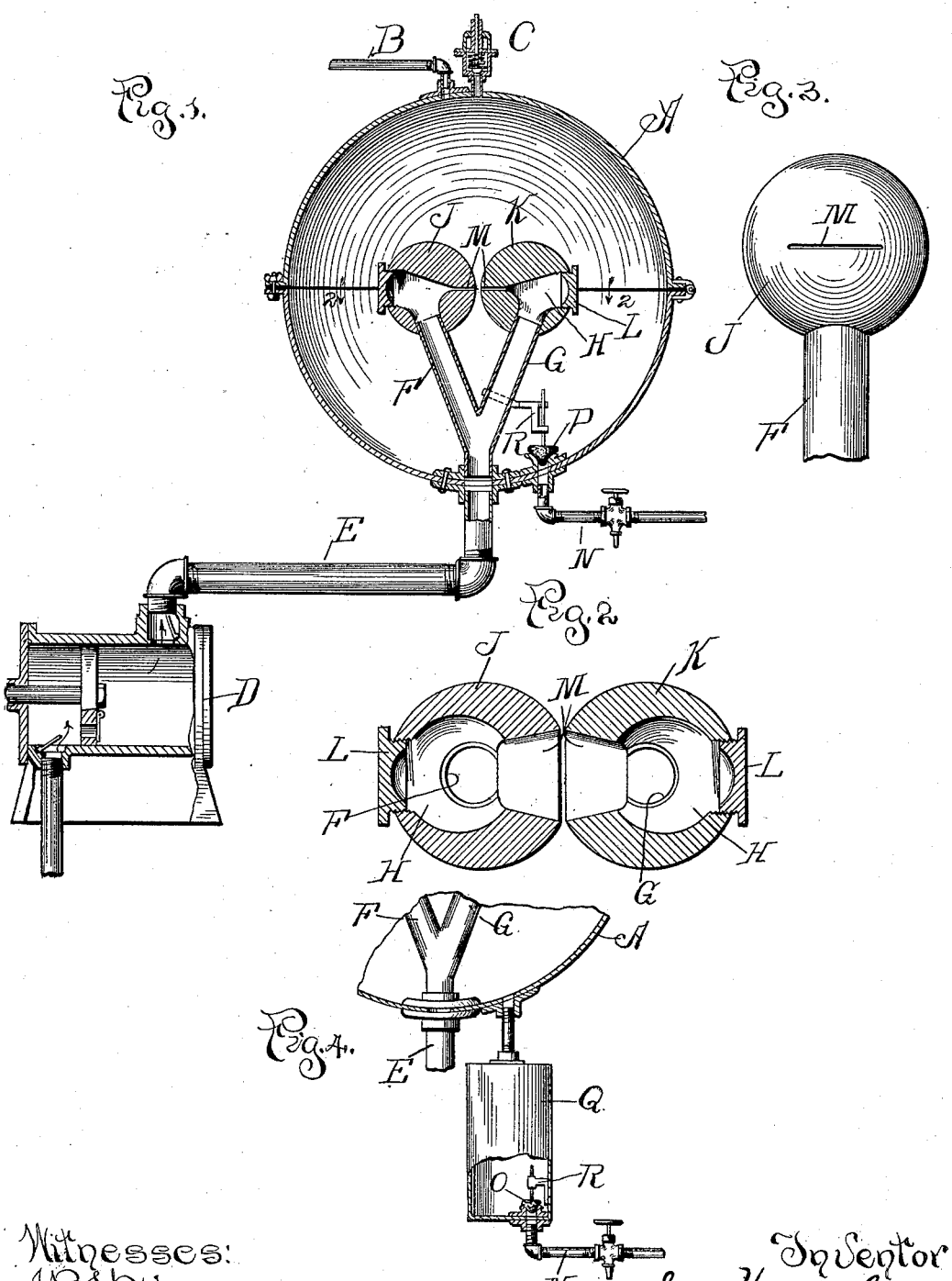

IVAN VAN DEN BROEK, OF CHICAGO, ILLINOIS, ASSIGNOR, BY MESNE ASSIGNMENTS, TO C. E. FREEMAN AND P. ANDERSON VALENTINE, OF SAME PLACE.

APPARATUS FOR TREATING LIQUIDS WITH OZONE, &c.

SPECIFICATION forming part of Letters Patent No. 662,509, dated November 27, 1900.

Application filed May 26, 1899. Serial No. 718,439. (No model.)

*To all whom it may concern:*

Be it known that I, IVAN VAN DEN BROEK, a subject of the Queen of the Netherlands, residing at Chicago, in the county of Cook and State of Illinois, have invented a new and useful Apparatus for Treating Liquids, of which the following is a specification.

This invention relates to apparatus for purifying liquids.

One object of the invention is to so treat liquids and fluids as to prevent acid decomposition therein and to place organic or inorganic microbes in a condition unfavorable to their development.

A further object of the invention is to so treat fluids and liquids as to eliminate or remove obnoxious odors therefrom and to purify the same and improve the aroma and taste.

Other objects of the invention will appear more fully hereinafter.

The invention consists substantially in the construction, combination, location, arrangement, and mode of operation, all as will be more fully hereinafter set forth, as illustrated in the accompanying drawings, and finally specifically pointed out in the appended claims.

In carrying my invention into practical operation I atomize the fluid or liquid to be treated in the presence of a purifying-gas under pressure. It is a well-known fact that by forcing a purifying-gas through a liquid the latter becomes aerated and the air molecules contained in the liquid are replaced by molecules of the gas. My process differs from that in that instead of forcing the gas through the fluid or liquid to be treated I expand and atomize the fluid in the presence of the gas, the latter being maintained under pressure. In this manner the purifying action of the gas reaches every particle of the liquid or fluid to be treated, and by employing ozone or oxygen as the purifying-gas the liquid or fluid is thereby thoroughly deodorized, the germs or microbes contained therein (and which cause acid decomposition) are placed in a condition unfavorable to their development, and the liquid is perfectly aerated and purified.

In the case of paper-pulp in a fluid or liquid form treated, as above explained, with ozone as the purifying agent in addition to the deodorization thereof, as above explained, it is bleached.

In the case of dairy products—such as milk, cream, butter, cheese, or the like—treated in a liquid form in accordance with the principles of my invention not only is the acid decomposition thereof arrested and suspended, but the taste and digestive qualities thereof are not impaired or changed in the least, as in the case of sterilizaing, and hence I am enabled to keep such products in their original sweet and pure state for a longer period of time, even in hot weather or in hot climates. In treating dairy products I prefer to employ ozone in as pure a state as it can be produced as the purifying-gas.

In some cases I may employ compressed air as the purifying agent. This cheapens the cost of the process materially.

In the treatment of whiskies, brandies, and high-wines I prefer to employ oxygen as the purifying agent, and I have found that when treated therewith in accordance with the principles of my invention they are aged, their flavor is developed, certain desirable aromas added, and their taste is improved and without lessening the alcoholic strength thereof. Alcoholic vapors are materially improved and obnoxious odors are removed therefrom when treated with oxygen or ozone.

In the case of vinegar the acidifying action is greatly hastened without injuring the germs which are aerobe—that is, they have an affinity for the element $O_2$. In this case a reduced pressure may be employed.

Water treated in accordance with the principles of my invention is thoroughly aerated and deodorized, and in the case of water containing gypsum held in solution by carbon dioxid ($CO_2$) such carbon dioxid is evaporated, thus permitting the gypsum to precipitate, and hence softening the water. In this case it is advisable to operate under free access of air and light.

In the case of oils, fats, and the like the action of deleterious germs which produce acid decomposition is suspended and a thorough deodorization takes place, thus enabling such substances to be preserved.

In the practical application of my invention I thoroughly atomize and expand the liquid to be treated. This may be accomplished by releasing the liquid under pressure in a fine spray or mist, whereby the liquid expands and is thoroughly atomized. This operation is effected in a suitable chamber containing the purifying-gas under compression.

In the accompanying drawings I have shown an illustrative form of apparatus adapted for use in carrying out my invention.

Figure 1 is a view in central section. Fig. 2 is a detail view in section on the line 2 2, Fig. 1. Fig. 3 is a detached detail view of an atomizer, showing the discharge-opening. Fig. 4 is a broken detail view, parts in section, showing a slightly-modified arrangement.

The same part is designated by the same reference-sign wherever it occurs throughout the several views.

Reference-sign A designates a chamber in which the atomizing of the liquid to be treated is effected. This chamber may be of any suitable form, construction, and arrangement, adapting it to the uses and purposes of the invention. In the particular form shown, to which, however, the invention is not limited, this chamber is of spherical form and is made in two sections hinged together and adapted to be secured together, the meeting edges thereof being suitably constructed to form a gas and water tight joint. Communicating with this chamber is a pipe B, preferably, though not necessarily, at a point in the top thereof, which pipe delivers from any suitable tank or supply of the purifying-gas, such as ozone or oxygen. This purifying-gas is delivered through pipe B under a suitable degree of pressure. The chamber A may be provided with a suitable pressure, relief, or safety valve, as indicated at C, by which the pressure in the chamber A may be relieved in case it rises above the safety-point. The material to be treated is delivered into chamber A under pressure in any suitable manner. I have indicated a pump D, which should be a high-pressure pump of any suitable construction. This pump delivers the liquid into the chamber A through a pipe E. Within the chamber this pipe is formed with the branches F G, which should be of exactly the same cross-sectional area. Each branch terminates in a head or cap J K, preferably, though not necessarily, of spherical shape, through which is formed a chamber H. This chamber is closed at one end in any suitable manner, as by means of the screw-caps L, and at the other or diametrically opposite ends said chambers terminate in thin or narrow slits or openings M. In practice the two heads are arranged in line with each other and with the slit or opening M of the one in exact alinement and in close proximity with that of the other head, as clearly shown in Figs. 1 and 2. The slits or openings M should be of identically the same area, and the dimensions thereof are dependent upon the density of the particular liquid to be treated. The more dense the liquid the greater the distance between the lips of said openings, and hence the greater the area thereof. The slits or openings of the two juxtaposed heads J K should be brought into as close proximity to each other as the density of the liquids treated will permit.

From the foregoing description it will be seen that the liquid to be treated is projected under pressure from the heads in thin sheets of equal volume and area and under equal pressure. These thin sheets meet each other, thus causing the liquid to be thoroughly atomized into a fine mist or spray and at the same time to become expanded by being relieved of the pressure under which it is projected from the heads. This expansion and thorough atomization occurs in the chamber A, in which the purifying-gas is maintained under pressure, and hence every particle of the liquid treated is acted upon by the purifying-gas. The liquid thus treated finally settles by gravity into the bottom of chamber A and may be drawn off through pipe N. I have shown a floating valve P for controlling pipe N, said valve arranged to unseat when submerged in the collected fluid at the bottom of the chamber, but seating again when the liquid becomes exhausted, thus preventing the escape through pipe N. If desired and in order to still further insure against escape of the gas through pipe N, the liquid from chamber A may first be collected in a suitable tank or vessel Q, arranged in communication with chamber A and the draw-off pipe N, and the floating valve O may be arranged in the bottom of said tank or vessel, as clearly shown in Fig. 4. I have shown a suitable guide R, by which the movements of the floating valve may be guided.

While I have specified a number of different liquids which may be treated in accordance with the principles of my invention, I desire it to be distinctly understood that my invention and its practical application are not confined or limited to the specific liquids mentioned, as many other liquids or fluids or substances in a liquid or fluid state may also be treated with advantage in accordance with the principles above pointed out; but, Having now set forth the object and nature of my invention and the various steps and mode of procedure embodying the same and having shown and described a form of apparatus adapted for use in carrying my invention into practical operation and having set forth the construction, function, and mode of operation thereof, what I claim as new and useful and of my own invention, and desire to secure by Letters Patent, is—

1. In an apparatus of the class described, a chamber, a pipe for delivering a purifying-gas under pressure into said chamber, in combination with juxtaposed heads having slits arranged opposite each other in the proximate surfaces of said heads, and means for delivering the material into said chamber through said slits, and under pressure, whereby the material is atomized and expanded in the presence of the purifying-gas as and for the purpose set forth.

2. In an apparatus of the class described, a chamber, a pipe for delivering ozone under pressure into said chamber, heads arranged in said chamber in proximity to each other, and having juxtaposited elongated narrow or thin slits of equal area through the proximate portions thereof, in combination with means for delivering the material to be treated, in equal volume and under equal pressure, through said slots, whereby the material is delivered into said chamber in meeting jets or streams and is thereby atomized, as and for the purpose set forth.

3. In an apparatus of the class described, a closed chamber, means for delivering a purifying-gas under pressure into said chamber, a pump for delivering the material to be treated under pressure, a pipe delivering from said pump and extending into said chamber, said pipe terminating in two branch pipes of equal area, a head forming the terminal of each branch pipe, each head provided with a passage therethrough, each passage terminating in a narrow elongated slit or opening, the slit or opening in one head being presented toward and in close proximity to the slit or opening in the other head, whereby the material is delivered into said chamber in thin sheets or streams which meet each other, thereby becoming thoroughly atomized, as and for the purpose set forth.

In witness whereof I have hereunto set my hand, this 16th day of February, 1899, in the presence of the subscribing witnesses.

IVAN VAN DEN BROEK.

Witnesses:
S. E. DARBY,
E. C. SEMPLE.